Aug. 4, 1925.

G. M. CUSACK 1,548,191

AUTOMATIC IGNITION CONTROL DEVICE

Filed Nov. 12, 1923    2 Sheets-Sheet 1

Inventor
George M. Cusack
By Frank E. Liname, Jr.
Attorney.

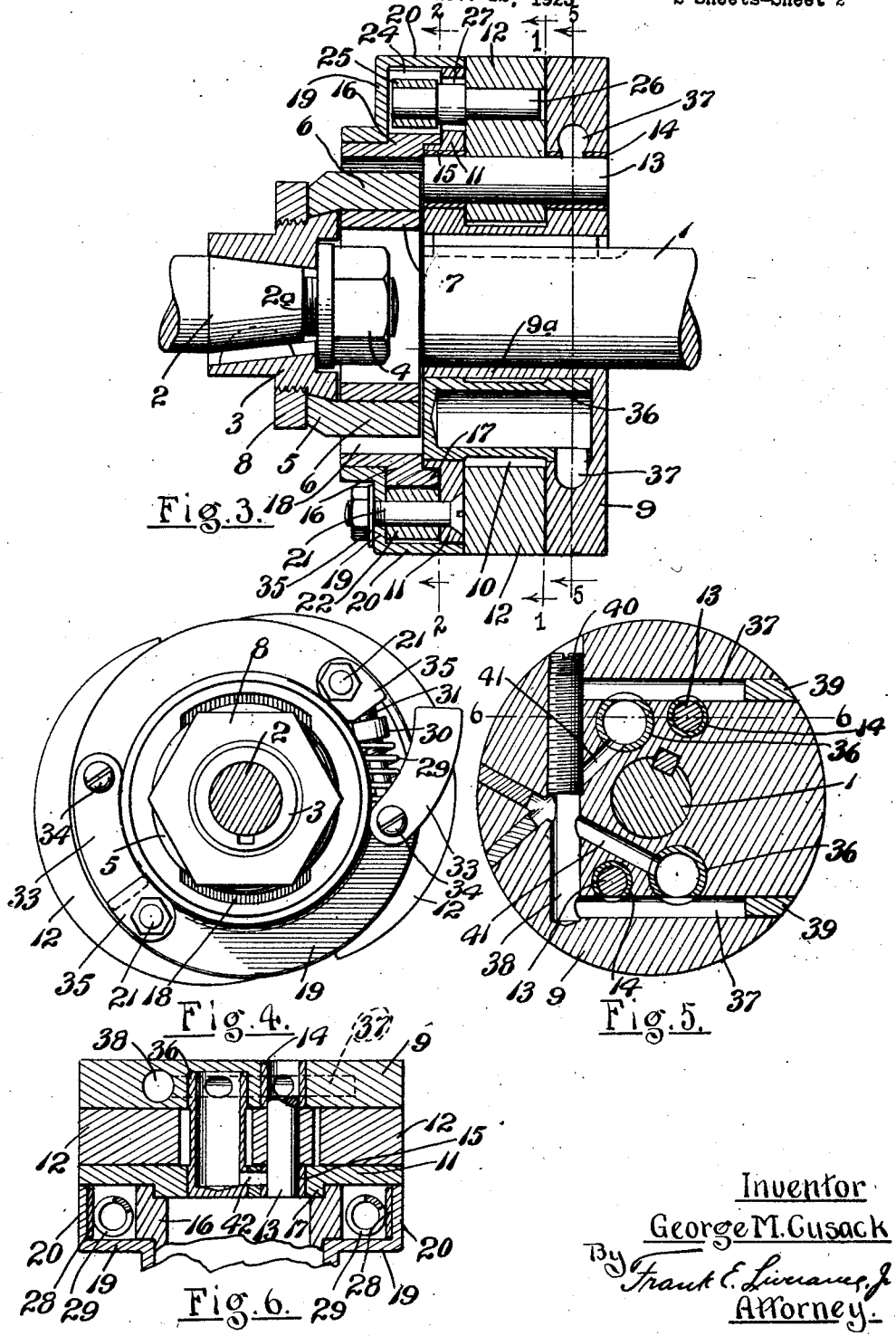
Aug. 4, 1925.  
G. M. CUSACK  
1,548,191  
AUTOMATIC IGNITION CONTROL DEVICE  
Filed Nov. 12, 1923   2 Sheets-Sheet 2
Inventor  
George M. Cusack  
By Frank E. Liverans, Jr.  
Attorney.

Patented Aug. 4, 1925.

1,548,191

UNITED STATES PATENT OFFICE.

GEORGE M. CUSACK, OF GRAND RAPIDS, MICHIGAN.

AUTOMATIC IGNITION-CONTROL DEVICE.

Application filed November 12, 1923. Serial No. 674,423.

*To all whom it may concern:*

Be it known that I, GEORGE M. CUSACK, a citizen of the United States of America, residing at Grand Rapids, in the county of Kent and State of Michigan, have invented certain new and useful Improvements in Automatic Ignition-Control Devices; and I do hereby declare the following to be a full, clear, and exact description of the invention, such as will enable others skilled in the art to which it appertains to make and use the same.

This invention relates to a mechanism for automatically controlling the time of spark in ignition systems for internal combustion engines. The particular constructions and the various functions served thereby will appear fully and in detail as understanding of the invention is had from the following description, taken in connection with the accompanying drawings, in which, Fig. 1 is a vertical section taken substantially on the plane of line 1—1, of Fig. 3.

Fig. 3 is a section taken substantially on the plane of the broken line 3—3 of Fig. 1.

Fig. 4 is a view looking against the left hand end of Fig. 3.

Fig. 5 is a vertical section on the plane of line 5—5 of Fig. 3, and

Fig. 6 is a horizontal section on the plane of line 6—6 of Fig. 5.

Figure 1:
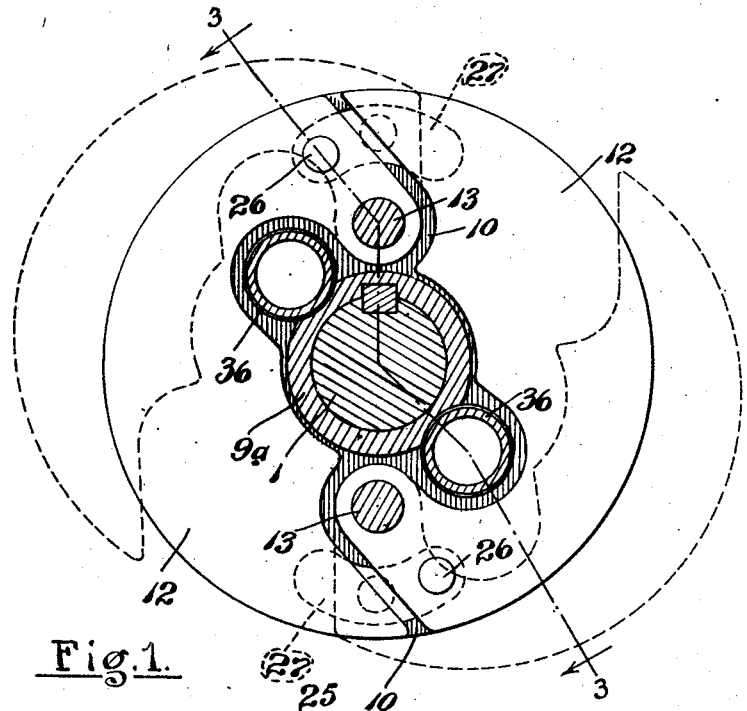
Figure 2:
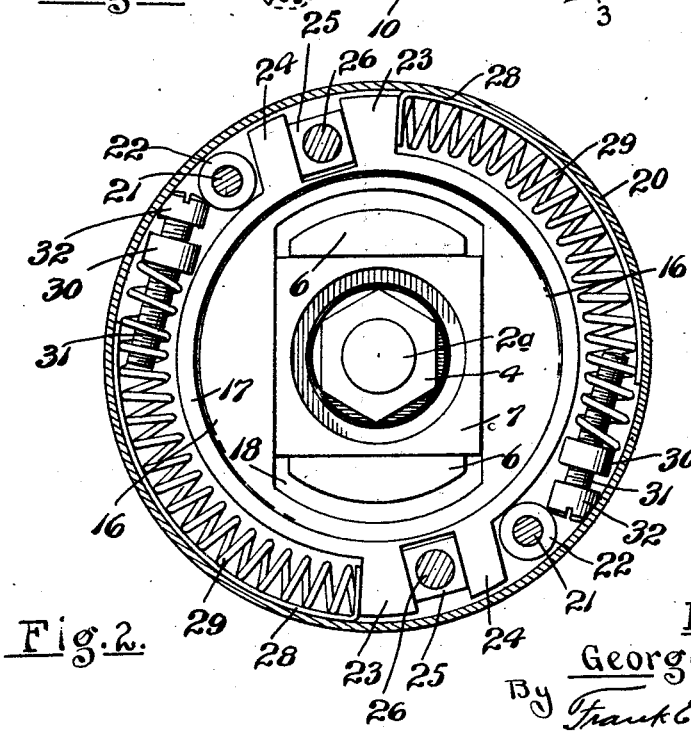
Fig. 2 is a like view on the plane of line 2—2 of Fig. 3.

Like reference characters refer to like parts in the different figures of the drawings, the sections are taken looking in the directions indicated by the arrows, and the constructions shown in Figs. 1, 2 and 3 are enlarged, the actual size of the device being shown in the remaining figures of the drawings.

The shaft 1, in practice is the pump shaft of an automobile, in alinement with which is a second shaft 2, in certain types of motor vehicles, the magneto shaft, in others the timer shaft as where battery ignition is used. The said shafts are coupled together so that the magneto shaft is driven by the shaft 1, and it is a feature of the present invention that the device for which automatically controls the time of spark also includes a coupling for connecting the shafts, all to be located in a very limited space, two and three-eighths inches wide in practice, in standard constructions of motor vehicles now in use.

On the end of the shaft 2 a member 3 is located and secured in position by a nut 4 which is located on the threaded extension $2^a$ of the shaft 2. This member is keyed to the shaft so as to be held securely against rotative movement with respect thereto. A collar 5 fits against an outwardly tapered inner portion of the member 3 and from this collar at opposed points two fingers 6 extend toward the shaft 1, having flat inner sides which fit against opposed sides of a square member 7, the same having an opening therethrough for the accommodation of nut 4 and the part $2^a$. A lock nut 8 is threaded on the member 3 against the collar 5 for securing it in position against rotative movement with respect to said member, it being evident that on loosening the nut, an adjustment of the collar with respect to the member 3 and the shaft 2 may be made when desired.

The controller body, indicated at 9 is a cylinder of metal in which a relatively deep and wide groove 10 is cut entirely around it, leaving a central sleeve $9^a$ to pass over shaft 1 to which it is securely keyed. The formation of the annular groove 10 leaves a flange 11 spaced from the outer main portion of the controller, as shown. In the groove, two weights 12 are located, of irregular shape as shown in the drawings, being pivotally mounted at one end on pins 13 which pass through the flange 11 and the thicker part of the body, and are mounted in bushings 14 and 15 in said body and flange.

At the inner side of the controller body an equalizer member 16 is located, substantially in the form of a ring and having an annular lip 17 at its inner end which passes over an annular shoulder formed on the flange 11, thereby centering and locating the member 16 which is rotatable on the shoulder with respect to the controller body. An opening 18 having a width between vertical sides thereof equal to the width of the block 7 which is located in said opening and may have a limited up and down movement therein. The fingers 6 also extend into said opening. It is evident that this makes a coupling connection between the shaft 2 and the member 16 which is mounted on the controller body.

Covering the member 16 is a cup-shaped housing having a vertical side 19 and an annular flange 20 projecting therefrom over the edges of the flange 11 thereby housing the connections between the body and the member 16. This housing is secured in place by two screw bolts 21 which pass through the flange 11, then through spacing sleeves 22 and then through the side 19 of the housing, having nuts threaded on their outer ends to bind the parts together. The spacing sleeves are long enough that the member 16 is left free for movement and is not bound between the housing member and the flange 11 of the controller body.

From the member 16 at opposed sides thereof, two spaced apart lugs 23 and 24 project into the space between the flange 20 and the outer curved side of the member 16. A block 25 is located between each pair of lugs and a pin 26 passes through each lug and through a slot 27 in the adjacent flange 11 and then into a weight 12 at a point a short distance from the pivot pin 13 therefor (see Fig. 1). A curved shoe 28 of flat sheet metal is located with one end turned to bear against each lug 23 and fitting against the inner curved side of the flange 20 and a coiled spring 29 is located at one end against each bent end of a shoe 28 and extends toward the opposite lug 24, as shown in Fig. 2. A nut 30 is located at the opposite end of each spring 29 through which a screw 31 passes, its head 32 being pressed against a sleeve 22 while the projecting end of the screw extends into the spring as shown.

In the vertical side 19 of the housing, openings are made over the parts where the nuts 30 are located, the same being normally closed by closure plates 33 pivotally mounted at one end at 34 and adapted at their free ends to pass under clips 35 which are held in place by the nuts on screw bolts 21, as shown in Fig. 4. The plates 33 may be swung to one side so that access may be had to the nuts 30 if at any time it is desired to adjust the tension of the springs, which may be accomplished by moving the nuts to different positions on screws 31, as is evident.

The shaft 1 being continuously driven when the engine with which it is associated is running, the body 9 is also continuously driven. The pins 26 on the weights connected to the body entering blocks 25 cause the member 16 to turn. If the speed of rotation is slow, the weights 12 occupy an inner position and the circuit breaking in the magneto to make the spark is retarded. On higher speeds, the centrifugal action causes the weights to throw outward, with a consequent change in the relative positions of the body 9 and the equalizer member 16 and a compression of the springs 29, the amount of outward throw of the weights being controlled by the relative resistance of the springs. This movement of the member 16 which drives the shaft 2 advances the spark. Accordingly there is an automatic advancement of the spark on increased speed of the engine and automatic retarding thereof as the speed is decreased, the retard being greatest when the engine is stopped, whereby the starting of the engine on retarded spark is made automatically necessary. At the same time the advancement of the spark is automatically taken care of as it is needed with increased engine speeds.

I have provided means for effectively lubricating all parts which need oiling. This consists in supplying two oil holding reservoirs 36 in the form of cylinders closed at one end inserted into the body 9 through the flange 11 close to the inner sleeve 9ª. Openings 37 are bored in the heavier portion of the body 9 so as to intersect the cylinders 36 and also the bushings 14 on pins 13, and both openings 37 at one end lead into a larger long opening 38 bored at right angles to the two openings 37. The outer ends of the openings 37 are closed by plugs 39 and the outer end of the opening 38 by a removable screw plug 40. Two passages 41 lead one from each reservoir 36 back to the opening 38 and a passage is made from each oil reservoir 36 to and through an adjacent bushing 15, as shown in Fig. 6. The oil is entered into the device when it is in the position shown in Fig. 5, plug 40 being removed and the whole of the openings, passages and reservoirs filled, the two passages into the reservoirs 36 permitting the escape of air which is not trapped therein, and the supply of oil which may be carried is sufficient to last a very long time to serve to keep the pins 13 lubricated at all times.

From the foregoing, it is apparent that I have produced a compact, durable and serviceable device of this character which can serve as a spark control and coupler of the driving shaft to the magneto or timer shaft. The automatic operation insures that the opening of the circuit breakers and breaking of the primary circuit in the armature windings of the magneto takes place when the electrical force is at the highest point, thereby producing the most intense spark at all times, and in the other type of ignition circuit the circuit breakers are operated to cause the spark when the piston in the engine is in position to deliver its greatest amount of power. This construction is effective with either high speed or low speed engines, making the necessary and most effective advancement or retarding of the spark, the control being adapted for either type of engine on merely adjusting the tension of the springs 29 properly therefor. The invention has many advantages. It simplifies control of an internal combustion engine, permitting the removal of the usual manually operable spark lever. On account of the spark being at the proper position for every kind of speed that the engine may have, the power of the same is increased, this causing a saving of fuel used. Back firing in starting is eliminated, the spark always being automatically positioned at full retard when the engine is not running. The spark is at its fullest intensity at all times, either at full retard or full advance, the starting of the engine being made easier because of this. Knocking of the connecting rod bearings against the crank shaft under heavy load and slowing of the engine, overheating, carbonization of the cylinders, wear of bearings are all obviated. The device is very simple in action and requires no care other than periodical oiling and this at long intervals. It causes a magneto to produce a strong spark by opening the circuit breakers at the instant the magnetic force between the armature and pole pieces is broken and before the current in the windings of the armature is reversed, no loss occurring as would otherwise take place. The coupling is simple and compact and has sufficient flexibility to take care of faulty alinement of shafts. And the whole structure is of a size that it can be used in the restricted space now utilized for a simple coupling alone. All of these features combine to make the invention one of practical merit.

I claim:

1. In a device of the class described, a driving shaft, a driven shaft in substantial alinement therewith, a controller body of cylindrical form fixed on the driving shaft, said body having an annular groove therein between its sides, weights pivotally mounted on the body and seated in said groove, an equalizer member mounted for movement about the axis of the driving shaft on the controller body at the side thereof adjacent the driven shaft, said member having pairs of spaced apart outwardly projecting lugs thereon, one pair for each weight, pins one on each weight extending between the lugs of said pairs of lugs, said pins being located a distance from the weight pivots, springs acting to oppose the outward movement of the weights, and means on the end of the driven shaft connecting it with said equalizer member.

2. In a device of the character described, a driving shaft, a driven shaft, a controller body fixed on the driving shaft and formed with a deep anuular groove therein between the sides of the body, two weights located in the groove, pins passing through one end of each of the weights and mounted for pivotal movement in the body, a pin attached to each weight a short distance from each pivot pin and extending laterally from each weight through a slot in the adjacent portions of the body, an equalizer member mounted against the side of the body adjacent the driven shaft and adapted to turn about the axis of the driving shaft, said member having two pairs of spaced apart lugs projecting therefrom, a block between the lugs of each pair into which each of the second mentioned pins enters, a coiled spring bearing against one of the lugs of each pair at one end, a nut against which the other end of each spring bears, a screw passing through the nut and having a head, a stop member against which the head of the screw bears, and means connecting the equalizer member with the driven shaft, substantially as described.

3. In a device of the class described, a driving shaft, a driven shaft in substantial alinement therewith, a controller body of cylindrical form attached to the driving shaft, said body being formed with a deep annular groove therein between the ends of the body, two weights located in the groove, a pin passing through the body and one end of each weight, a second pin attached to each weight a short distance from the first pin and extending through a slot in the adjacent portion of the body, an equalizer member mounted against the side of the body adjacent the driven shaft and adapted to turn about the axis of the driving shaft, said member having two pairs of spaced apart lugs projecting therefrom and formed with a central rectangular opening therethrough, a block between the lugs of each pair of lugs, the second pins entering said blocks, a housing member located against the same side of the body as the equalizer member, spacing sleeves between the housing and body one near each pair of lugs, a screw having a head bearing against each sleeve, a nut on each screw, a coiled spring located between each nut and a lug of the farthest pair of lugs, a block slidably mounted in the opening in said equalizer member, and a member having two spaced apart fingers attached to the driven shaft, said fingers passing alongside opposite sides of the last mentioned block.

4. A construction containing the elements in combination defined in claim 3, said housing member having closure plates thereon, one over each nut, and means for movably mounting the closure plates on the housing member.

5. A construction containing the elements in combination defined in claim 3, combined with oil holding reservoirs located in the body and passages from said reservoirs to the pivot pins for the weights, combined with means for filling said reservoirs.

6. A construction containing the elements in combination defined in claim 3, combined with two oil holding reservoirs in the body located parallel to the weight pivot pins, said body having two openings each connecting a reservoir with a pivot pin, and a third opening located substantially at right angles to the two first passages or openings into which said first openings lead, and a removable plug closing the open of the third opening.

In testimony whereof I affix my signature.

GEORGE M. CUSACK.